United States Patent [19]

Inaba et al.

[11] 4,333,363

[45] Jun. 8, 1982

[54] INDEX TABLE ASSEMBLY

[75] Inventors: Seiuemon Inaba; Tokiji Shimajiri, both of Kawasaki; Kenichi Toyoda, Hino, all of Japan

[73] Assignee: A. Aoki & Associates, Tokyo, Japan

[21] Appl. No.: 160,525

[22] Filed: Jun. 18, 1980

Related U.S. Application Data

[63] Continuation of Ser. No. 863,346, Dec. 22, 1977, abandoned.

[30] Foreign Application Priority Data

Dec. 29, 1976 [JP] Japan ................. 51-160626

[51] Int. Cl.³ .......................................... B23Q 17/00
[52] U.S. Cl. .................................. 74/826; 74/813 C
[58] Field of Search ................. 74/816, 817, 822, 826; 82/36 A; 74/813 R, 813 C

[56] References Cited

U.S. PATENT DOCUMENTS

| | | | |
|---|---|---|---|
| 2,796,776 | 6/1957 | Locke, Sr. et al. | 74/822 |
| 3,135,136 | 6/1964 | Mentley et al. | 74/577 |
| 3,381,578 | 5/1968 | Buchanan | 74/820 |
| 3,905,257 | 9/1975 | Thumm et al. | 74/822 |
| 4,082,019 | 4/1978 | Shichida et al. | 74/826 |

*Primary Examiner*—Kenneth Dorner
*Attorney, Agent, or Firm*—Staas & Halsey

[57] ABSTRACT

An indexing table assembly adapted to be mounted on a machine tool or other industrial machine, comprising first and second screw elements coaxially engaged with each other and mounted for movement along their axes, mechanism for moving said first screw element along its axis, a turntable connected to said second screw element and movable therewith, mechanism preventing said second screw element from being moved beyond a predetermined range, said mechanism for moving said first screw element comprising a cylindrical piston directly connected to said first screw element, a circular fluid chamber in which said cylindrical piston is mounted for movement, said cylindrical piston separating said chamber into first and second chambers, a source of pressurized fluid, a control valve for controlling the flow of pressurized fluid into either said first chamber or said second chamber with the result that when the pressurized fluid flows into said second chamber the first screw element is moved positively in one direction, and then when the pressurized fluid flows into said first chamber said first screw element is moved positively in the other direction, a turntable operated control circuit for said control valve, and cam and valve mechanism for effecting a dampening action of the fluid in said first chamber during indexing operation of the assembly, said cam being connected to said second screw element.

5 Claims, 12 Drawing Figures

INDEX TABLE ASSEMBLY

This is a continuation, of application Ser. No. 863,346 filed Dec. 22, 1977, now abandoned.

FIELD OF THE INVENTION

The present invention relates to an improvement in an indexing table assembly adapted for use in diverse kinds of industrial machines, such as machine tools for example.

BACKGROUND OF THE INVENTION

Many mechanisms for indexing a table member are known. U.S. Pat. No. 3,381,578, granted to W. G. Buchanan, discloses an indexing means of the Geneva motion type. In the indexing means of the Geneva motion type, a driven wheel formed with radial slots is driven by a rotating cam having a drive pin. The drive pin is advanced to enter into one of the radial slots of the driven wheel so that the driven wheel is indexed by one pitch. However, with the indexing means of the Geneva motion type, a difficulty is encountered in that particular care must be paid in fabricating the above-mentioned Geneva motion elements, such as the rotating cam with a drive pin and a driven wheel, as well as in assembling the Geneva motion mechanism. This is because, otherwise, unfavorable impact motions between the driven wheel and the drive pin of the rotating cam will occur at the moment the indexing of the driven wheel is started or stopped. Further, when it is required to increase the number of radial slots of the driven wheel, the diameters of the driven wheel and the rotating cam must necessarily be increased. This fact results in an unfavorable increase in the size and shape of the indexing mechanism of the Geneva motion type. In addition, in the indexing means of the Geneva motion type, the rotating cam and the driven wheel are always arranged so that the axes of both rotating cam and driven wheel are transversely spaced apart from one another, resulting in an increase in the entire size and shape of the indexing mechanism.

On the other hand, U.S. Pat. No. 3,135,136, granted to M. B. MENTLEY, et al, discloses an indexing mechanism employing a fluid-operated cylinder as a power source for causing an indexing movement of the index member. In that indexing mechanism, the fluid operated cylinder provides movement for a feed pawl element, which in turn causes a rotational indexing motion of the index member. Therefore, a considerably complicated mechanism is indispensable in order that the rotational indexing motion of the index member be brought about by a linear motion of an output element of the fluid-operated cylinder. Further, in that indexing mechanism, prior to commencing of the indexing motion of the index member, a finger arm provided for maintaining the indexing position of the index member must be disengaged from the index member by employing a different fluid-operated cylinder. This fact not only adds to the complexity of the index mechanism, but also results in an increase in the manufacturing cost of the index mechanism.

SUMMARY OF THE INVENTION

An object of the present invention is to provide an indexing table assembly that is simple and, thus, of low manufacturing cost.

Another object of the present invention is to provide an indexing table assembly having therein a compact indexing mechanism.

A further object of the present invention is to provide an indexing table assembly in which the linear motion of only one fluid-operated cylinder is sufficient for completing the indexing motion of the indexing table assembly.

A still further object of the present invention is to provide a simple indexing table assembly in which a screw mechanism including therein a pair of mutually threadedly engaged members is employed.

A further object of the present invention is to provide an indexing table assembly in which, while one of the threadedly engaged members is moved forward in an axial direction thereof by a drive mechanism, an indexing operation of the turn table and a releasing of an indexing position holding mechanism from the turn table are both achieved.

A still further object of the present invention is to provide an indexing table assembly of the type mentioned above in which, while one of the threadedly engaged members is retracted in an axial direction opposite to the direction in which the same member has been forward by the drive mechanism, engaging of the indexing position holding mechanism with the rotary table is achieved.

The present invention will be apparent from the ensuing description of preferred embodiments, with reference to the accompanying drawings wherein:

DESCRIPTION OF PREFERRED EMBODIMENTS

Figure 1:
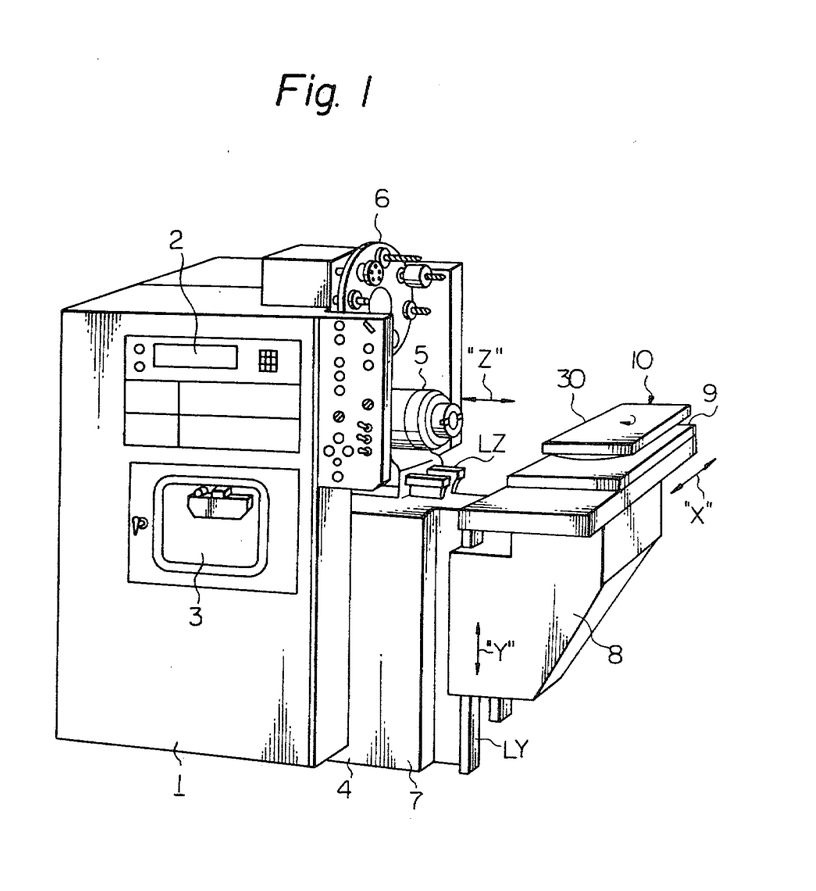
FIG. 1 is a perspective view of a numerically controlled machine tool provided with an index table assembly according to the present invention.

Referring to FIG. 1, illustrating the outside of a numerically controlled machine tool provided with an index table assembly of the present invention, a numerical control device 1 incorporates therein an operation panel 2 and a command tape reader 3. The numerical control device 1 is associated with a machine tool 4 so as to form one integral assembly of a numerically controlled machine tool. The machine tool 4 is provided with a spindle head 5, an automatic tool changer 6, a machine bed 7, a knee 8, and a table 9. On the table 9 is mounted an index table assembly 10 according to the present invention. In the machine tool of FIG. 1, the spindle head 5 is arranged to be movable in an axial direction (Z-axis direction) along a rail structure LZ. The knee 8 is arranged to be movable in a Y-axis direction along a rail structure LY formed in the machine bed 7. The index table assembly 10 includes a turn-table 30, turnable about an axis parallel with the Y-axis. In the index table assembly, indexing of the turn table 30 at every quarter turn (ninety degrees) is performed as described later.

Figure 2:
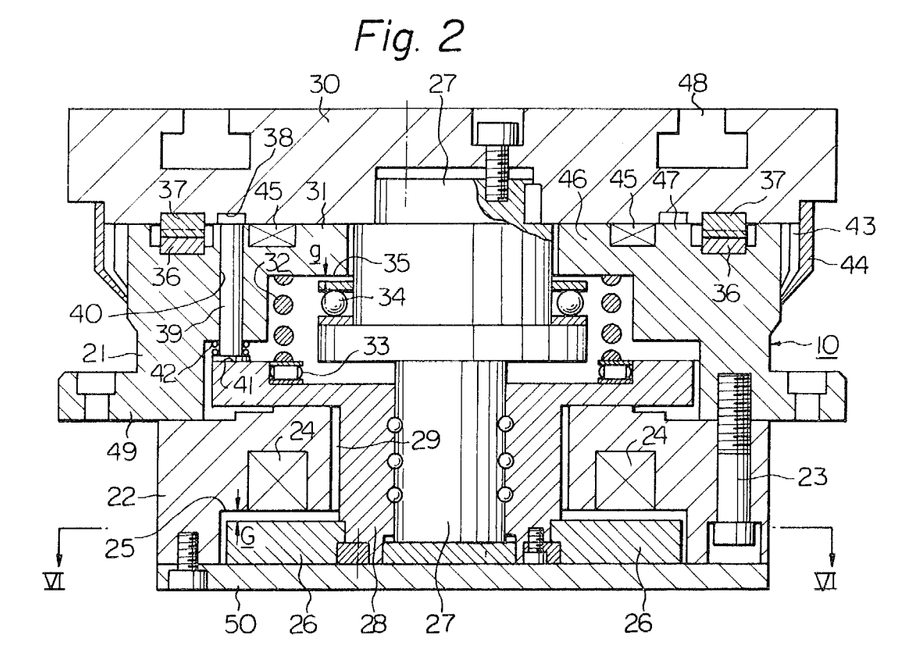
FIG. 2 is a cross-sectional view of an index table assembly according to an embodiment of the present invention.

Referring to FIG. 2, the index table assembly includes an upper base 21 and a lower base 22 both made of magnetic material. The lower base 22 is attached to the bottom surface of the upper base 21 by means of threaded bolts 23 (only one bolt 23 is shown in FIG. 2). The lower base 22 is provided with electrical windings 24 arranged coaxially with an axis of the base 22. Thus, the lower base 22 and the electrical windings 24 form an electrical magnet when the electrical windings 24 are electrically energized. A portion 25 of the lower base 22, which is shaped as a recessed portion of the lower base 22 adjacent to the electrical windings 24, functions as the magnetic pole of the electrical magnet. The magnetic pole portion 25 of the electrical magnet faces a plate member 26 made of magnetic material, and acts to magnetically attract the plate member 26 when the electrical windings 24 of the electrical magnet are energized. When the plate member 26 is attracted toward the magnetic pole portion 25 of the electrical magnet, the indexing operation of the index table assembly 10 is performed. That is to say, the electrical magnet, consisting of the lower base 22 and the electrical windings 24, and the plate member 26, operate as a drive means of the index table assembly of FIG. 2.

Coaxially with the axis of the index table assembly, there is arranged a ball screw mechanism comprised of a male screw element 27, a female screw element 28 and a plurality of balls disposed between the screw elements 27 and 28. The female screw element 28 is connected to the plate member 26 by means of any appropriate means, such as screws, and is fitted into a bush 29 disposed in the inside of the lower base 22. The bush 29 is provided for guiding the axial movement of the female screw element 28. The male screw element 27 has an upper end thereof connected to the turn table 30. Therefore, the male screw element 27 and the turn table 30 integrally perform an axial movement as well as a turning movement.

A coil spring 32 is arranged between an upper end of the female screw element 28 and an inner extension 31 of the upper base 21. The coil spring 32 is provided for always urging the female screw element 28 axially downward, as seen in FIG. 2. Therefore, the axially upward movement of the female screw element 28 is driven by the afore-mentioned drive means, while the axially downward movement of the female screw element 28 returning to the lowest position thereof is caused by the coil spring 32. However, a thrust bearing 33 is disposed between the coil spring 32 and the upper end of the female screw element 28, so that the axial spring force exhibited by the spring 32 does not prevent turning movement of the female screw element 28. A thrust bearing 34 is mounted on the male screw element 27, and a gap designated by "g" in FIG. 2 is provided between an uppermost face of the thrust bearing 34 and a lower face 35 of the extension 31 of the upper base 21 when the male screw element 27 is axially lowered to the lowest position thereof. Therefore, the male screw element 27 can move from the lowest position thereof by an axial amount corresponding to the gap "g". It should be noted that the above-mentioned gap "g" is adjusted to be smaller than a gap "G" which is provided between the magnetic pole portion 25 of the lower base 22 and the plate member 26 when the plate member 26 is not attracted toward the pole portion 25 at all.

Between the upper base 21 and the turn table 30, index plate members 36 and 37 having a generally ring shape, respectively, are arranged. The index plate member 36 is attached to the lower base 21 and is formed, in the face confronting the index plate member 37, with a plurality of recesses as described hereinafter. On the other hand, the index plate member 37 is attached to the turn table 30, and is formed with a plurality of convex portions complementary to the recesses of the index plate member 36. In FIG. 2, the indexing operation has not been initiated, and the convex portions of the index plate member 37 are engaged within the complementary recesses of the index plate member 36. That is to say, in the position shown in FIG. 2, the turn table 30 is locked to the upper base 21 by means of the index plate members 36 and 37, so that no turning motion of the turn table 30 is permitted. The index plate members 36 and 37 are disengaged from one another when the turn table 30, together with the male screw element 27, are moved axially upwardly until the gap "g" disappears.

The turn table 30 is provided, in the lower face thereof, with four circumferentially extending grooves 38. An axial pin 39, which is slidably held in a bore 40 of the upper base 21, is placed on the uppermost end face of the female screw element 28, so that the pin 39 is engageable into one of the circumferentially extending grooves 38 when the female screw member 28 is moved axially upward. A spring 42 is arranged so as to always urge the pin 39 toward the uppermost end face of the female screw element 28.

The grooves 38 of the turn table 30 and the pin 39 placed on the female screw element 28 cooperate with one another for attaining coarse indexing of the turn table 30. When the indexing operation of the index table assembly 10 is not initiated, the pin 39 is placed in the position wherein the top end of the pin 39 is kept flush with the upper end face of the upper base 21 so that no part of the pin 39 enters into any of the circumferentially extending grooves 38. In this condition the pin 39 is pressed against the female screw element 28 by the force exhibited by the spring 42. Immediately prior to the completion of the indexing of the turn table 30, the pin 39 enters into one adjacent groove 38 of the turn table 30 and is engaged with the end wall of said adjacent groove 38 so that the coarse indexing of the turn table 30 is performed by the pin 39.

Reference numeral 43 designates a wiping device which is attached to the lower circumference of the turn table 30 and is covered by a covering 44. The wiping device 43 is made of magnetic material, while the covering 44 is made of non-magnetic material. The wiping device 43 and covering 44 are provided for preventing any foreign material, such as fine cutting chips, from entering between the turn table 30 and the upper base 21. Electrical windings 45 are installed into the upper end face of the upper base 21 so as to be coaxial with the axis of the turn table 30. When the electrical windings 45 are energized, an electromagnetic field is formed in the portion of the upper base 21 adjacent to the windings 45. Thus, portions of the upper base 21, designated by reference numerals 46 and 47 act as magnetic poles which can attract the turn table 30 toward the upper base 21. This attraction of the turn table 30 toward the upper base 21 is very effective for maintaining the table 30 rigid after completion of each indexing operation of the turn table 30. Therefore, the turn table 30 can be used as, for example, an index work table of a machine tool as shown in FIG. 1.

Reference numeral 48 is a T shaped groove formed in the turn table 30. Reference numeral 49 is a flange which is formed in the lower part of the upper base 21 so that the index table assembly 10 can be mounted on a different machine. Reference numeral 50 designates a covering plate covering the bottom of the index plate arrangement 10.

Figure 3:
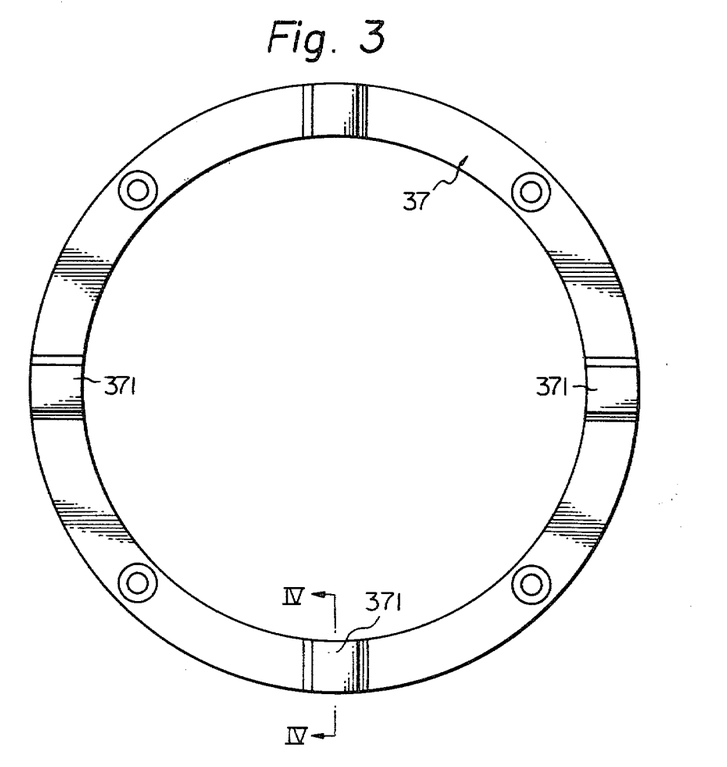
FIG. 3 is a plan view of one index plate employed in the index table assembly of FIG. 2.
Figure 4:
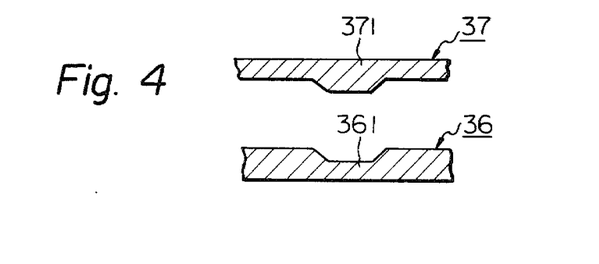
FIG. 4 is a partial cross-sectional view of two index plates employed in the index table assembly of FIG. 2.

Referring now to FIGS. 3 and 4, the structure of the index plate members 36 and 37 is illustrated. As is shown in FIGS. 3 and 4, the index plate member 37 attached to the table 30 (FIG. 2) has the shape of a ring member and is formed with four convex portions 371. (Note: the number of the convex portions 371 depends on the number of index positions of the turn table 30.) The four convex portions 371 are equiangularly arranged so that the adjacent convex portions 371 are circumferentially spaced apart from one another by an angle of 90 degrees. The index plate member 36 attached to the upper base 21 also has the shape of a ring member, although the member 36 is not shown in FIG. 3. The index plate member 36 is formed with recessed portions 361 (only one recess is shown in FIG. 4), the number of which is selected to be equal to the number of the convex portions 371 of the member 37. The recessed portions 361 are arranged so that the adjacent recessed portions 361 are circumferentially spaced apart from one another by an angle of 90 degrees. That is to say, the index plate members 36 and 37 are so structured that the convex portions 371 and the recessed portions 361 are engageable with one another. It should be understood that based upon the engageable arrangement of the four convex and four recessed portions 371 and 361, the index plate members 36 and 37 shown in FIGS. 3 and 4 can be used for indexing four positions of the turn table 30 (FIG. 2) with respect to the upper base 21 (FIG. 2) while the turn table 30 makes one complete turn.

Figure 5:
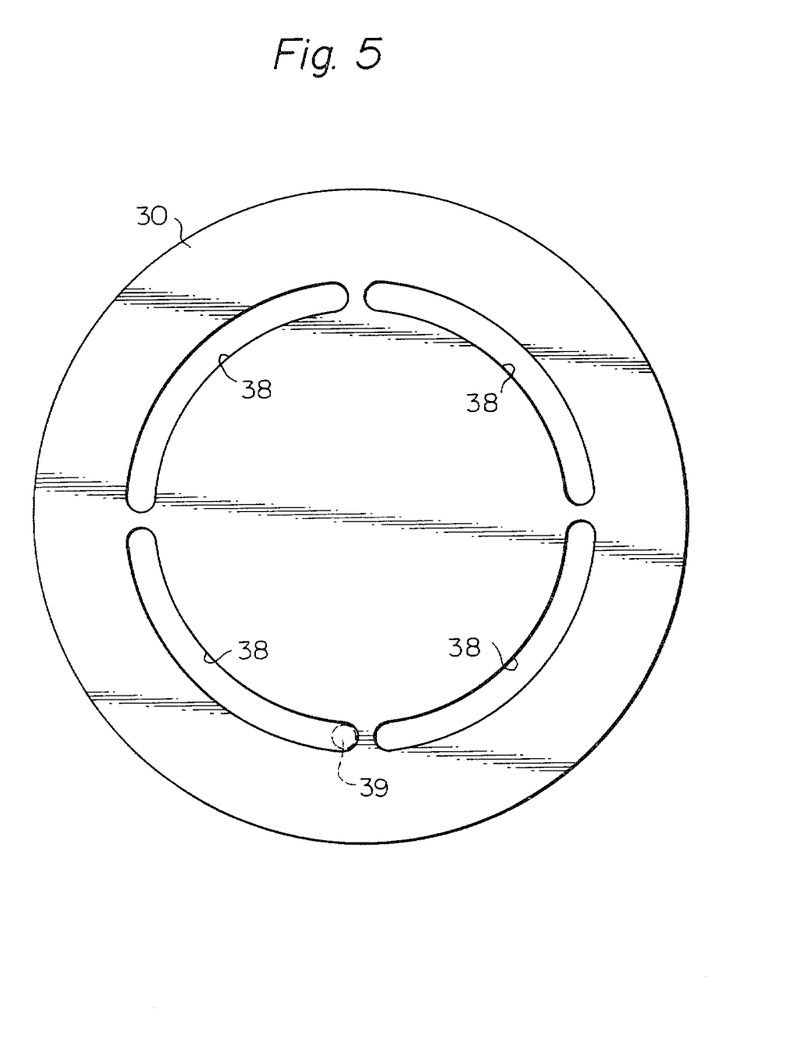
FIG. 5 is a plan view of a turn table employed in the index table assembly of FIG. 2, illustrating an arrangement of circumferentially extending grooves formed in the turn table.

Referring to FIG. 5 which illustrates an arrangement of grooves 38 on the turn table 30, each of four equal grooves 38 is so formed in the surface of the turn table 30 that the circumferential length of each groove 38 is substantially equal to a quarter of one complete circle. As was previously described with reference to FIG. 2, when an index operation of the turn table 30 is started, the pin 39 (FIG. 2) is engaged into one of four grooves 38. Therefore, when the turn table 30 is rotated through a quarter of one complete turn, one of the end walls of the groove 38 into which the pin 39 is engaged, abuts the pin 39. As a result, a coarse indexing of the turn table 30 is achieved.

Figure 6:
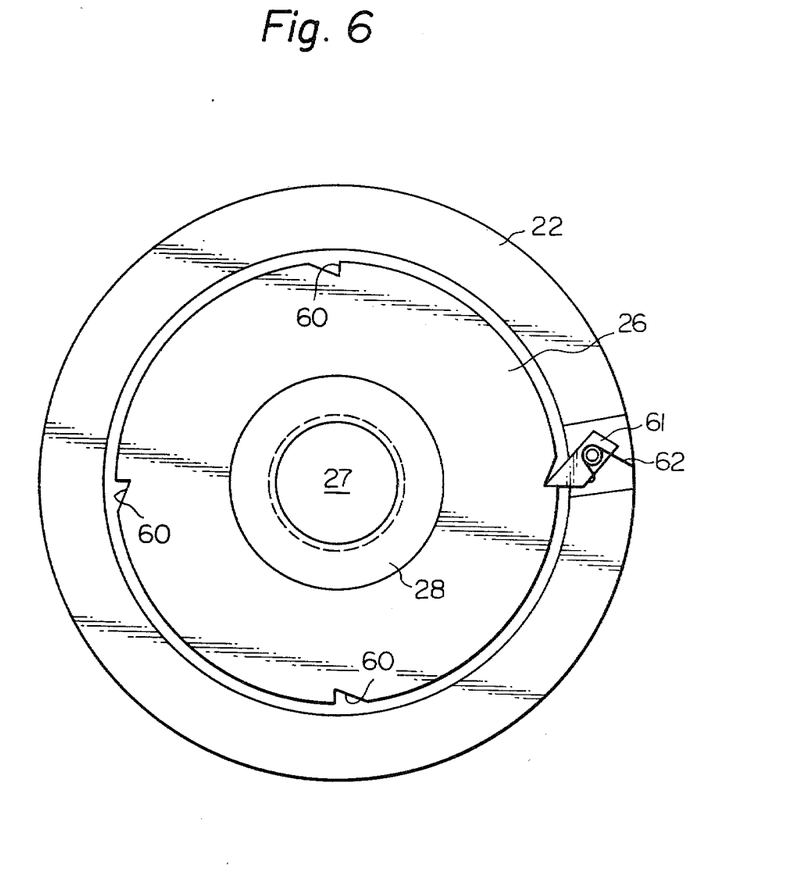
FIG. 6 is a plan view of a mechanism for preventing reverse turning of the turn table employed in the index table assembly of FIG. 2.

FIG. 6 illustrates a mechanism for preventing the rotation of the female screw element 28 shown in FIG. 2. In FIG. 6, the plate member 26 has, on the periphery thereof, detents 60 arranged with a predetermined space therebetween. The lower base 22 is provided with a pawl 61 with cooperation with the detents 60 of the plate member 26. The pawl 61 is always urged toward the periphery of the plate member 26 by the action of a spring 62. When the pawl 61 is engaged with one of the detents 60, the female screw element 28 is prevented from being rotated in the counterclockwise direction in FIG. 6 with respect to the lower base 22.

The description of the indexing operation of the index table assembly 10 will now be provided with reference to FIG. 2.

In FIG. 2 the indexing operation of the turn table 30 has not yet started. In order to cause one indexing operation of the turn table 30, that is, in order to rotate the turn table 30 through 90 degrees from the state of FIG. 2, the electrical windings 24 are first energized by applying electric current to the windings. As a result, the plate member 26 is electromagnetically attracted toward the magnetic pole portion 25 of the lower base 22. While the plate member 26 is being attracted toward the magnetic pole portion 25, the female screw element 28 is moved upwardly along with the male screw element 27 engaged with the element 28, since the female screw element 28 is fixed to the plate member 26. The upward movement of both screw elements 27 and 28 continues until the thrust bearing 34 abuts the lower face 35 of the extension 31. As soon as the thrust bearing 34 abuts the lower face 35, the upward movement of the male screw element 27 is stopped, while the female screw element 28 is moved further upwardly together with the plate member 26. At this stage, it should be noted that when the upward movement of the male screw element 27 is stopped, the index plate member 37 is disengaged from the index plate member 36. Therefore, the male screw element 27 together with the turn table 30 are brought into a state where they are free to rotate. On the other hand, the female screw element 28 is not permitted to rotate by the mechanism as shown in FIG. 6. Consequently, while the female screw element 28 together with the plate member 26 is moved further upwardly, the male screw element 27 is caused to rotate together with the turn table 30 through the ball screw mechanism arranged between the two elements 27 and 28. It should here be noted that the screw threads of the ball screw mechanism are formed so that, while the plate member 26 is moved upwardly by an amount corresponding to the gap "G", the male screw element 27 together with the turn table 30 are rotated through 90 degrees. When the rotation of the male screw element 27 and the turn table 30 approaches an end, the pin 39 has fully projected into one of the grooves 38. Therefore, when the end wall of the groove 38 in which the pin 39 projects, abuts against the pin 39, the rotation of the turn table 30 is completely stopped. Thereafter, the electrical windings 24 are de-energized, so that the magnetic attractive force acting between the magnetic pole portion 25 and the plate member 26 is eliminated. Thus, both male and female screw elements 27 and 28 are concurrently moved downwardly by the force exhibited by the spring 32. While both elements 27 and 28 are being downwardly moved, the index plate 37 comes into engagement with the index plate 36. Thus, accurate indexing of the turn table 30 is achieved. Further, as soon as the accurate indexing of the turn table 30 is achieved, the electrical windings 45 are energized. Therefore, the turn table 30 is electromagnetically attracted to the upper surface of the upper base 21, and is rigidly held by the upper base 21. When the male screw element 27 returns to the position shown in FIG. 2, the female screw element 28 has not yet returned to the position shown in FIG. 2 and continues its downward movement by the help of the spring 32. At this stage, since neither rotation of nor downward movement of the element 27 is permitted, the female screw element 28 returns to the position shown in FIG. 2 while rotating around the male screw element 27. The rotation of the female screw element occurs in the direction in which the mechanism shown in FIG. 6 is overrided. Thus, one complete indexing operation of the turn table 30 comes to an end, and the next indexing operation can be started by re-energizing the electrical windings 24.

The foregoing description is provided with respect to the embodiment of FIG. 2. However, some modification may be effected to the embodiment of FIG. 2. For example, if the gap "G" is filled with an oil, the indexing operation will be smoothly carried out due to the damping action of the oil.

FIGS. 7 through 12 illustrate an index table assembly according to a different embodiment of the present invention.

Figure 7:
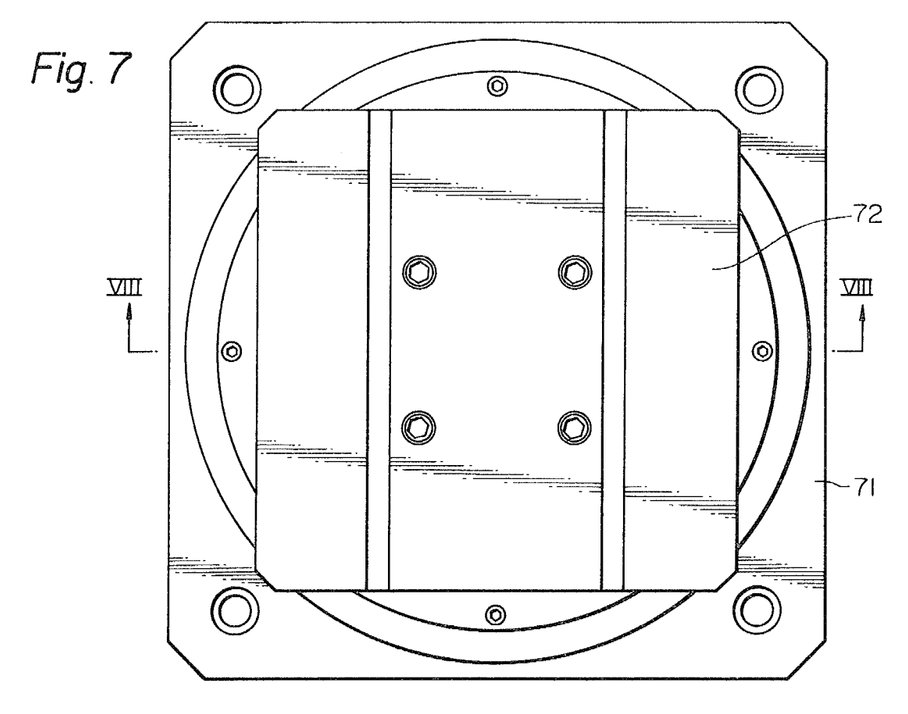
FIG. 7 is a plan view of an index table assembly according to another embodiment of the present invention.

Referring to FIG. 7, the index table assembly comprises a base 71 fixed to a machine to which the index table assembly is applied, and a turn table 72 capable of turning with respect to the base 71 from one to another indexing position. The turn table 72 is provided, on the uppermost surface thereof, with grooves for fixing, for example, a work piece to the turn table 72. In this embodiment, the turn table 72 is shaped as a square table.

Figure 8:
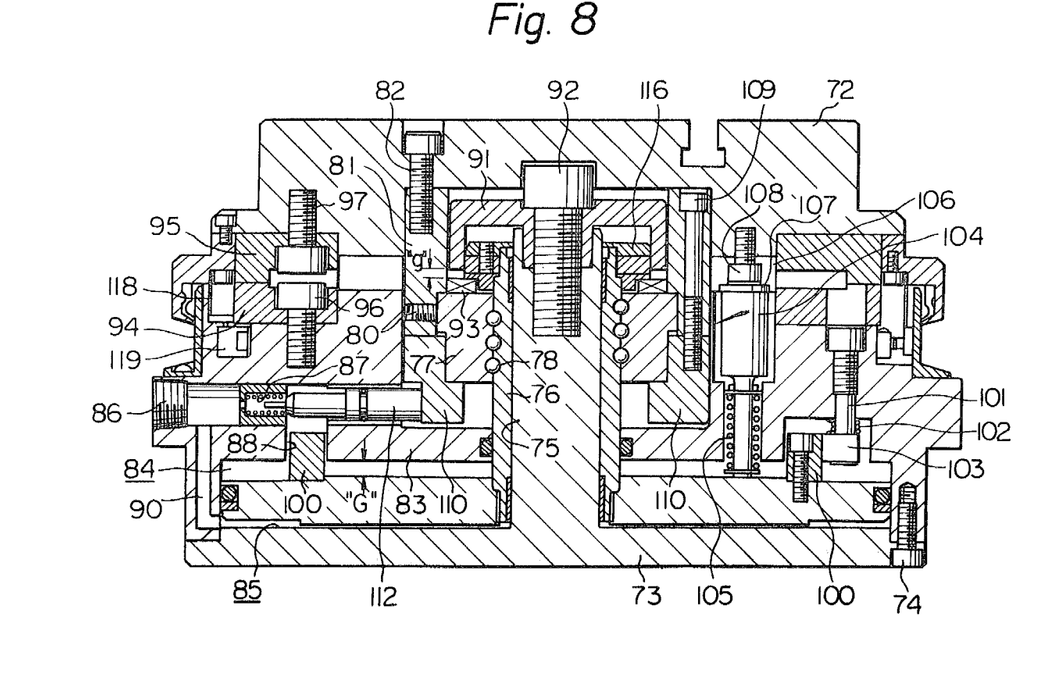
FIG. 8 is a cross-sectional view taken along the line VIII—VIII in FIG. 7.

Referring to FIG. 8, a covering plate 73 is fixed to the lowermost end of the base 71 by means of screws 74 (only one screw 74 is shown in FIG. 8). The covering plate 73 has a vertical boss 75 extending upwardly from the center of the covering plate 73. In this embodiment, the vertical boss 75 is integral with the covering plate 73. Onto the vertical boss 75, a male screw element 76 of a ball screw mechanism is loosely mounted. The ball screw mechanism consists of the male screw element 76, a female screw element 77 and a plurality of balls 78 disposed between the two members 76 and 77. The lowermost end of the male screw element 76 is connected to a piston member 79. The female screw element 77 is connected to the turn table 72 via screws 80 (only one screw 80 is shown in FIG. 8), an intermediate member 81 and screws 82 (only one screw 82 is shown in FIG. 8). A lower wall 83 of the base 71 and the cover plate 73 define therebetween a chamber of a fluid-operated cylinder which includes a first chamber 84 and a second chamber 85 separated by the piston member 79. The first chamber 84 is hydraulically connected to a fluid incoming and outgoing port 86, via an aperture 88 formed in the lower wall 83 of the base 71 and a fluid passageway 87. The second chamber 85 is hydraulically connected to a fluid incoming and outgoing port 89, described later with reference to FIG. 12, via a fluid passageway 90. With the above-mentioned fluid-operated cylinder, when a fluid under pressure, such as a pressurized air, is introduced into the first chamber 84 from the port 86, the piston member 79 is moved to and occupies the position shown in FIG. 8. Alternately, when the fluid under pressure is introduced into the chamber 85 from the port 89 (not shown in FIG. 8), the piston 79 is moved upwardly toward the lower wall 83 until a gap G shown in FIG. 8 is completely eliminated.

Figures 9, 10:
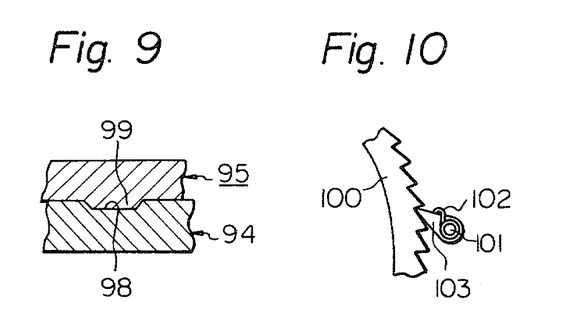
FIG. 9 is a partial cross-sectional view of two index plates employed in the index table assembly shown in FIGS. 7 and 8.
FIG. 10 is a partial plan view of a rotation preventing mechanism employed in the index table assembly of FIGS. 7 and 8.

A stop member 91 which functions to stop an upward movement of the female screw element 77 is connected to an uppermost end of the boss 75 by means of a screw 92. The stop member 91 is so arranged such that when the female screw element 77 engaged with the male screw element 76 is in an initial position thereof, as shown in FIG. 8, a gap "g" is provided between the uppermost face of a thrust bearing 93 attached to an uppermost end of the female screw element 77 and the lowermost face of the stop member 91. Index plates 94 and 95 are arranged to hold the turn table 72 at each indexed position of the turn table. The index plate 94 is fixed to the base 71 by means of screws 96 (only one screw 96 is shown in FIG. 8), while the index plate 95 is fixed to the turn table 72 by means of screws 97 (only one screw 97 is shown in FIG. 8). The index plate 94 is formed with a predetermined number of recess portions 94 (only one recess portion 94 is shown in FIG. 9) which are engageable with the same number of convex portions 95 (only one convex portion 95 is shown in FIG. 9) formed in the index plate 95. Both the recess portions 94 and convex portions are circumferentially arranged at an equal predetermined pitch.

Figure 11:
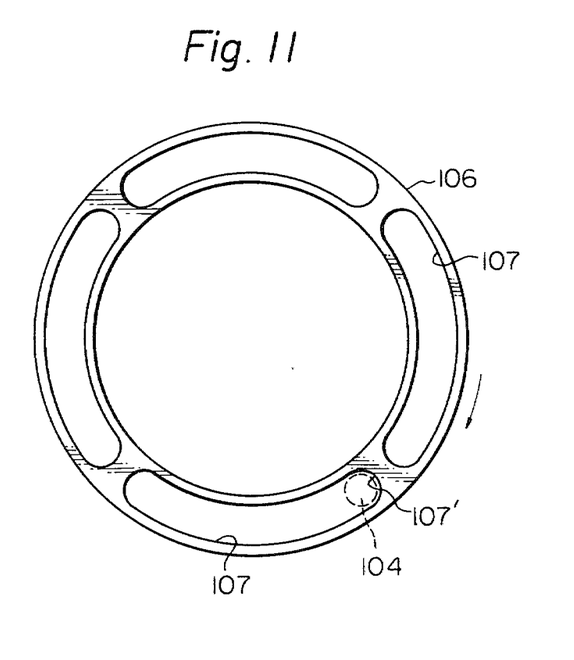
FIG. 11 is a plan view of a ring member employed in the index table arrangement shown in FIGS. 7 and 8, illustrating an arrangement of circumferentially extending grooves formed in the ring member.

In FIG. 8, a ratchet wheel 100 is fixedly mounted on the piston member 79 for the purpose of permitting the male screw element 76 together with the piston member 79 to be rotated in only one direction. The ratchet wheel 100 is engaged with a pawl element 103 which is mounted on a shaft 101 fixed to the base 71. The pawl element 103 is biased against the ratchet wheel 100 by spring 102, as seen in FIG. 10. A stop pin 104, which is provided for performing a coarse indexing of the turn table 72, is received in an axial bore formed in the base 71 and is always urged downwardly by a spring 105. A lowermost end of the stop pin 104 is seated on the uppermost face of the piston member 79. The uppermost end of the stop pin 104 is opposed to a ring 106 which is fixed to the lowermost face of the turn table 72 by means of screws 108 (only one screw 108 is shown in FIG. 8). The ring 106 is formed with four circumferentially extending grooves 107 as shown in FIG. 11. The four grooves 107 are separated from one another and have a circumferential length approximately equal to a quarter of one complete circumference, respectively. In other words, each groove 107 circumferentially extends through approximate 90 degrees with respect to the center of the ring 106, as will be understood from FIG. 11. The coarse indexing of the turn table 72 is attained when the turning motion of the turn table 72 is stopped due to the abutment of an end wall 108 of one of four grooves 107 against the stop pin 104. However, as soon as the end wall 108 abuts the stop pin 104, the turn table 72 will naturally rebound from the stop pin 104. Therefore, in order to prevent occurrence of the rebounding of the turn table 72, a cam member 110 (FIG. 8) is connected to the intermediate member 81 by means of a screw 109.

Figure 12:
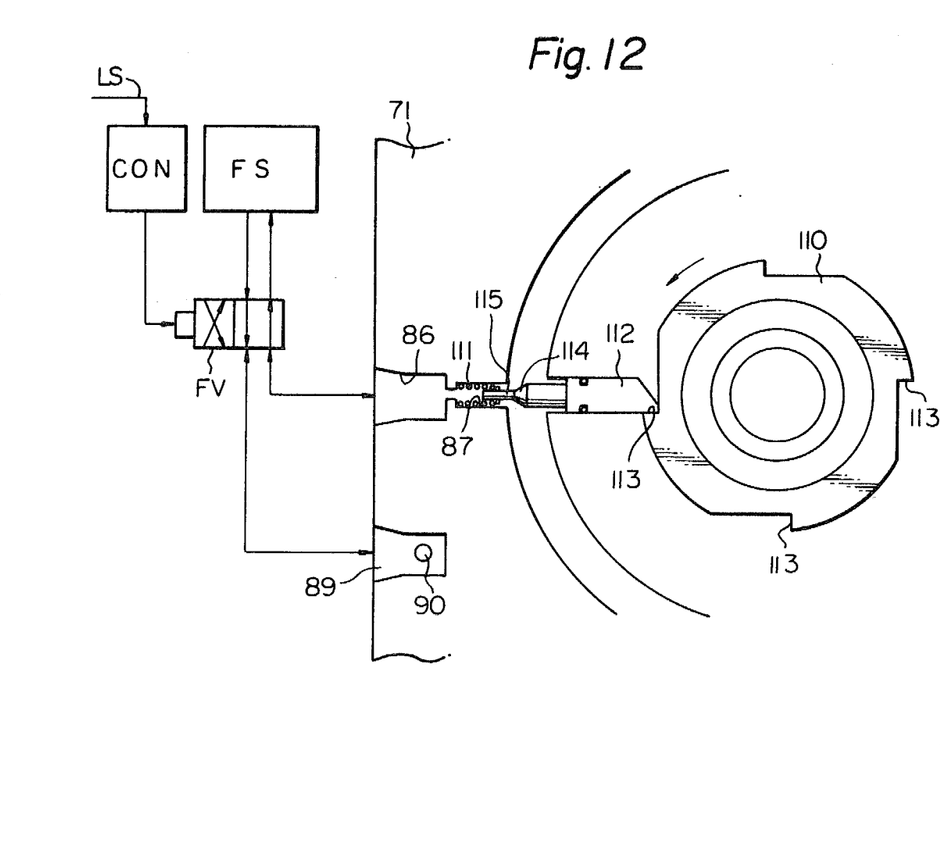
FIG. 12 is a partial plan view, in part schematic, of a mechanism for preventing reverse rotation of the turn table of the index table assembly shown in FIGS. 7 and 8.

As shown in FIG. 12, against the periphery of the cam member 110 abuts a cam follower 112 which is urged toward the center of the cam member 110 by the force of a spring 111. The cam member 110 is provided with abutments 113 arranged at a 90 degrees pitch. When the turn table 72 (FIG. 8) is rotated in the counterclockwise direction in FIG. 12, the cam member 110 is accordingly rotated in the counterclockwise direction. As a result, when an end of the cam follower 112 engages one of the abutments 113, the cam member 110 together with the table 72 are prevented from being rotated in the clockwise direction, as seen in FIG. 12. Further, the engagement of the cam follower 112 with one of abutments 113 occurs immediately after the engagement of the end wall 107' (FIG. 11) of one of the grooves 107 against the stop pin 104 (FIGS. 8 and 11).

As shown in FIG. 12, the cam follower 112 is formed integrally with a tapered portion 114 and needle 115 which is arranged so as to project into the fluid passageway 87. Therefore, after commencement of indexing operation of the turn table 72, and while the cam member 110 is being gradually rotated in the counterclockwise direction as seen in FIG. 12, the needle 115 of the cam follower 112 is gradually pushed into the fluid passageway 87 by the cam member 110. As a result, the opening of the fluid passageway 87 adjacent the aperture 88 (FIG. 8) is gradually blocked by the tapered portion 114 of the cam follower 112. Consequently, some amount of the fluid under pressure is confined within the first chamber 84 and the aperture 88 during the indexing operation of the turn table 72. Thus, the confined fluid under pressure gradually counteracts the upward movement of the piston member 79 (FIG. 8) during the indexing operation. That is to say, the confined fluid is able to act as a damping fluid.

The block CON shown in FIG. 12 designates a control circuit for a flow control valve FV. FIG. 12 illustrates a state where the flow control valve FV is switched so that a fluid under pressure is supplied from a fluid source FS toward the port 89 via the flow control valve FV, and concurrently, a fluid under pressure is returned from the port 86 to the fluid source FS via the flow control valve FS.

Referring again to FIG. 8, a stop member 116 is fixedly mounted on an uppermost end of the male screw element 76 and contacts the uppermost face of the thrust bearing 93. The stop member 116 operates so as to stop the downward movement of the male screw element 76 and the piston member 79.

The description of the operation of the index table assembly shown in FIGS. 8 through 12 is as follows.

In FIG. 8 the indexing operation of the turn table 72 has not yet started. Thereafter, the control circuit CON sends a command to the flow control valve FV so that the flow control valve FV is switched to the position shown in FIG. 12. As a result, a fluid under pressure, for example, pressurized air, is supplied from the fluid source FS toward the second chamber 85 (FIG. 8) via the control valve FV, the port 89 and the fluid passageway 90 (FIG. 8). The first chamber 84 (FIG. 8) is hydraulically connected to the fluid source FS via the aperture 88 (FIG. 8), the fluid passageway 87, the port 86 and the flow control valve FV. Therefore, in FIG. 8, the piston member 79, the male screw element 76, the female screw element 77 and the turn table 72 concurrently start to move upwardly due to the supply of the fluid under pressure into the first chamber 84 until the thrust bearing 93 mounted on the female screw element 77 abuts the stop member 91. When the bearing 93 abuts the stop member 91, the index plate 94 has already been disengaged from the index plate 95. As soon as the thrust bearing 93 abuts the stop member 91, the upward movement of the female screw element 77 is stopped. However, the upward movement of the piston member 79 together with the male screw element 76 continues, and the continuing upward movement of the male screw element 76 causes the female screw element 76 to rotate through the ball screw mechanism. During the rotation of the female screw element 77, the piston member 79 is prevented from being rotated due to the engagement of the ratchet wheel 100 attached to the piston member 79 with the pawl member 103. At this stage, it should be understood that the ball screw mechanism is so structured that the rotation of the female screw element 77 occurs in the clockwise direction with respect to the central axis of the index table assembly. It should further be understood that the rotation of the female screw element 77 accompanies the turning of the turn table 72 about the central axis of the index table assembly. While the turn table 72 turns through 90 degrees, the piston member 79 is moved upwardly and comes close to the lower wall 83 of the base 71. Therefore, the stop pin 104 is lifted against the spring force of the spring 105 until the pin 104 sufficiently enters into one of the grooves 107 of the ring 106. As a result, when the 90 degrees turning motion of the turn table 72 comes to an end, the end wall 107' (FIG. 11) of the groove 107, into which the stop pin 104 has entered, abuts the stop pin 104, so that the coarse indexing operation of the turn table 72 is completed. Concurrently, the cam follower 112 is engaged with one of the pawls 113 of the cam member 110, as is best shown in FIG. 12. Consequently, reverse turning of the turn table no longer occurs. At this stage, an actuator 118 attached to the turn table 72 actuates a limit switch 119. Thus, a switching signal LS (FIG. 12) is supplied from the limit switch 119 to the control circuit CON (FIG. 12), so that the control circuit CON switches the flow control valve FV. As a result, the supply of the fluid under pressure from the fluid source FS (FIG. 12) is switched toward the first chamber 84 from the second chamber 85. Therefore, the piston member 79, the male screw element 76, the female screw element 77 and the turn table 72 are moved downwardly together due to the pressure of the fluid introduced into the second chamber 85. During the downward movement of the turn table 72, the index plate 94 is re-engaged with the index plate 95, so that the turn table 72 is held at its indexed position with certainty. After completion of the downward movement of the turn table 72 and the female screw element 77, the downward movement of the male screw element 76 and the piston member 79 still continues. At this stage, a counterclockwise rotation of the male screw element 76 and the piston member 79 concurrently occurs, with respect to the central axis of the index table assembly. When the stop member 116 abuts the uppermost face of the thrust bearing 93, the downward movement and rotation of the male screw element 76 and the piston member 79 are completed. As a result, one cycle of the indexing operation of the turn table 72 comes to an end, and the next cycle of the indexing is ready to begin.

What is claimed is:

1. An indexing table assembly adapted to be mounted on a machine tool or other industrial machine, comprising first and second screw elements coaxially engaged with each other and mounted for movement along their axes, means for moving said first screw element along its axis, a turntable connected to said second screw element and movable therewith, means for preventing said second screw element from being moved beyond a predetermined range, said means for moving said first screw element comprising a cylindrical piston directly connected to said first screw element, a circular fluid chamber in which said cylindrical piston is mounted for movement, said cylindrical piston separating said chamber into first and second chambers, a source of pressurized fluid, a control valve for controlling the flow of pressurized fluid into either said first chamber or said second chamber with the result that when the pressurized fluid flows into said second chamber the first screw element is moved positively in one direction, and then when the pressurized fluid flows into said first chamber said first screw element is moved positively in the other direction, a turntable operated control circuit for said control valve, and cam and valve means for effecting a dampening action of the fluid in said first chamber during indexing operation of the assembly, said cam being connected to said second screw element.

2. An indexing table assembly as in claim 1, further comprising balls rotatably mounted between said first and second screw elements.

3. An indexing table assembly as in claim 1, further comprising means permitting said first screw element to rotate in only one direction.

4. An indexing table assembly as in claim 1, wherein said piston means is mounted for axial and circumferential movement.

5. An indexing table assembly as in claim 1, wherein said means for preventing said second screw from being moved beyond a predetermined range comprises a stationary member against which said second screw abuts.

* * * * *

UNITED STATES PATENT AND TRADEMARK OFFICE
CERTIFICATE OF CORRECTION

PATENT NO. : 4,333,363

DATED : June 8, 1982

INVENTOR(S) : Inaba et al.

Page 1 of 2

It is certified that error appears in the above-identified patent and that said Letters Patent is hereby corrected as shown below:

Drawings, Sheet 7 of 9, FIG. 8, please add reference numerals --71-- and "79" as indicated below.

Fig. 8

UNITED STATES PATENT AND TRADEMARK OFFICE
CERTIFICATE OF CORRECTION

PATENT NO. : 4,333,363  
DATED : June 8, 1982  
INVENTOR(S) : Inaba et al.

Page 2 of 2

It is certified that error appears in the above-identified patent and that said Letters Patent is hereby corrected as shown below:

Column 2, line 26, after "been" insert --moved--;
    *line 30, after "of" insert --the--.

Column 3, line 55, "means" should be --mechanism--.

*Column 6, line 10, "with cooperation" should be --which cooperates--.

Column 7, line 1, "downwardly moved" should be --moved downwardly--.

Column 8, line 6, delete "an".

Column 10, line 57, after "indexing" insert --operation--.

Signed and Sealed this

Twenty-first Day of December 1982

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,333,363
DATED : June 8, 1982
INVENTOR(S) : Inaba et al.

It is certified that error appears in the above-identified patent and that said Letters Patent is hereby corrected as shown below:

Front Page, [73] Assignee, "A. Aoki & Associates" should be --Fujitsu Fanuc Limited--.

Signed and Sealed this

Twenty-sixth Day of July 1983.

[SEAL]

Attest:

GERALD J. MOSSINGHOFF

Attesting Officer   Commissioner of Patents and Trademarks